(12) United States Patent
Meng et al.

(10) Patent No.: US 10,718,936 B2
(45) Date of Patent: Jul. 21, 2020

(54) DISPLAY PANEL AND DISPLAY DEVICE

(71) Applicant: BOE TECHNOLOGY GROUP CO., LTD., Beijing (CN)

(72) Inventors: Xianqin Meng, Beijing (CN); Wei Wang, Beijing (CN); Xue Dong, Beijing (CN); Yafeng Yang, Beijing (CN); Xiaochuan Chen, Beijing (CN); Jifeng Tan, Beijing (CN); Xiandong Meng, Beijing (CN); Jian Gao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 105 days.

(21) Appl. No.: 16/067,980

(22) PCT Filed: Dec. 1, 2017

(86) PCT No.: PCT/CN2017/114240
§ 371 (c)(1),
(2) Date: Jul. 3, 2018

(87) PCT Pub. No.: WO2018/161650
PCT Pub. Date: Sep. 13, 2018

(65) Prior Publication Data
US 2019/0310456 A1 Oct. 10, 2019

(30) Foreign Application Priority Data
Mar. 9, 2017 (CN) .......................... 2017 1 0138779

(51) Int. Cl.
*G02B 26/00* (2006.01)
*G02B 5/18* (2006.01)

(52) U.S. Cl.
CPC ......... *G02B 26/005* (2013.01); *G02B 5/1814* (2013.01); *G02B 5/1866* (2013.01); *G02B 2207/115* (2013.01)

(58) Field of Classification Search
CPC .. G02B 26/005; G02B 5/1866; G02B 5/1814; G02B 2207/115
See application file for complete search history.

(56) References Cited

U.S. PATENT DOCUMENTS 8,115,987 B2 * 2/2012 Bita ..................... G02B 26/005
359/291
9,791,689 B1 * 10/2017 Hupkens .............. G02B 26/005
(Continued)

FOREIGN PATENT DOCUMENTS

CN 103592759 A 2/2014
CN 103605206 A 2/2014
(Continued)

OTHER PUBLICATIONS

International Search Report and Written Opinion dated Feb. 28, 2018.

*Primary Examiner* — Andrew Sasinowski
(74) *Attorney, Agent, or Firm* — Dilworth & Barrese, LLP.; Michael J. Musella, Esq.

(57) ABSTRACT

A display panel includes a light waveguide layer and a first substrate disposed opposite to each other, and further including an electrowetting control layer disposed between the light waveguide layer and the first substrate, the electrowetting control layer including a first electrode layer, a second electrode layer, and a grating layer and an electrowetting layer which are disposed between the first electrode and the second electrode layer, the grating layer and the electrowetting layer are configured to operatively couple light with a
(Continued)

set transmittance, a setting direction, and a set wavelength out of the light waveguide layer.

19 Claims, 4 Drawing Sheets

(56) References Cited

U.S. PATENT DOCUMENTS

| | | | | |
|---|---|---|---|---|
| 2010/0194854 A1* | 8/2010 | Kroll | ................... | G02B 26/005 348/40 |
| 2010/0289870 A1* | 11/2010 | Leister | ................. | G02B 26/005 348/40 |
| 2014/0140654 A1* | 5/2014 | Brown | ....................... | G02F 1/29 385/10 |
| 2015/0253591 A1 | 9/2015 | Kato et al. | | |
| 2016/0320656 A1* | 11/2016 | Chen | ..................... | G02F 1/1334 |

FOREIGN PATENT DOCUMENTS

| | | |
|---|---|---|
| CN | 103760705 A | 4/2014 |
| CN | 106291943 A | 1/2017 |
| CN | 106597658 A | 4/2017 |
| WO | 2014084018 A1 | 6/2014 |

\* cited by examiner

DISPLAY PANEL AND DISPLAY DEVICE

TECHNICAL FIELD

Embodiments of the present disclosure relate to a display panel and a display device comprising the display panel.

BACKGROUND

Currently, with the development of Virtual Reality (VR) and Augmented Reality (AR) products, higher requirements have been made for the transmittance and resolution (Pixels Per Inch, PPI) of display panels. And it is hard for conventional display structures to meet future requirements.

Conventional display technologies such as liquid crystal display (LCD) and Organic Light Emitting Display (OLED) cannot achieve high transparency of the display panel, thereby affecting the transmittance of light from backside of the display panel and the transmitted spectrum. For example, a conventional LCD device comprises a backlight source and a display panel. The display panel comprises an array substrate and a color filter substrate disposed opposite to the array substrate. A liquid crystal layer is disposed between the array substrate and the color filter substrate, and the back surface of the array substrate and the back surface of the color filter substrate are all disposed with a polarizer. Due to the influence of various functional layers such as the polarizer and the color filter layer, the transmittance of the display panel and the transmitted spectrum are greatly affected. And at the same time, being confined by the manufacturing process, it is difficult for conventional LCDs and OLEDs to achieve high PPI, and as the emitted light are divergent, it is hard for conventional LCDs and OLEDs to achieve near-eye display of monocular focus.

SUMMARY

At least one embodiment of the present disclosure provides a display panel, comprising a light waveguide layer and a first substrate disposed opposite to each other, and further comprising an electrowetting control layer disposed between the light waveguide layer and the first substrate, the electrowetting control layer comprising a first electrode layer, a second electrode layer, and a grating layer and an electrowetting layer which are disposed between the first electrode layer and the second electrode layer, the grating layer and the electrowetting layer are configured to operatively couple light with a set transmittance, a setting direction, and a set wavelength out of the light waveguide layer.

In one embodiment of the present disclosure, the first electrode layer is disposed on a side of the light waveguide layer facing the first substrate, the second electrode layer is disposed on a side of the first substrate facing the light waveguide layer, the grating layer is disposed on the first electrode layer, and the electrowetting layer is disposed on the grating layer.

In one embodiment of the present disclosure, the electrowetting layer comprises a first fluid and a second fluid, a difference between a refractive index of the first fluid and a refractive index of the grating layer is less than or equal to 0.05, and difference between a refractive index of the second fluid and a refractive index of the grating layer is greater than or equal to 0.1.

In one embodiment of the present disclosure, the first fluid is an aqueous fluid having conductive characteristics, the second fluid is an oily fluid having insulating characteristics; or the first fluid is an aqueous fluid having insulating characteristics, and the second fluid is an oily fluid having conductive characteristics.

In one embodiment of the present disclosure, one or more side surfaces of the light waveguide layer are configured as an incident surface for collimated backlight, the light waveguide layer and the grating layer form a waveguide grating coupler, and a refractive index of the light waveguide layer is greater than a refractive index of the first electrode layer and the grating layer.

In one embodiment of the present disclosure, the display panel further comprises a second substrate, wherein the light waveguide layer is disposed on the second substrate, or the light waveguide layer and the second substrate form an integral structure.

In one embodiment of the present disclosure, the grating layer is a one-dimensional grating which comprises a plurality of grating stripes, the one-dimensional grating is made of a transparent dielectric material, a thickness of the one-dimensional grating is 100 to 1000 nm, and a duty cycle of the one-dimensional grating is 0.1 to 0.9.

In one embodiment of the present disclosure, the grating layer is a two-dimensional grating which comprises a plurality of grating blocks arranged in matrix, the plurality of grating blocks are made of a transparent dielectric material, a thickness of the plurality of grating blocks is 100 to 1000 nm, and a duty cycle of the plurality of grating blocks is 0.1 to 0.9.

In one embodiment of the present disclosure, the display panel further comprises a first protection film and/or a second protection film, wherein the first protection film is disposed on a side of the light waveguide layer facing away from the first substrate, and/or the second protection film is disposed on a side of the first substrate facing away from the light waveguide layer.

In one embodiment of the present disclosure, the grating layer is a micro-grating layer or a nano-grating layer.

At least one embodiment of the present disclosure provides a display device, comprising the display panel as mentioned above.

In one embodiment of the present disclosure, the display device further comprises an edge-type collimated backlight source which is configured to generate collimated light and is disposed at one side or more sides of the light waveguide layer.

Embodiments of the present disclosure provide a display panel and a display device. In the display panel, an electrowetting layer based on electrowetting technology and a grating layer based on a light waveguide grating coupling technology are provided. A light color is selected through the grating layer so that a color filter is eliminated, and the light emitting direction is controlled through the grating layer such that a polarizer is eliminated. And as each of the functional layers is made of transparent material, a high transmittance display is achieved. Since the grating layer can couple light out in the range of micron or nano grating periods, the size of the pixel area can be made small, thus achieving a high PPI display. Combining the electrowetting layer and the grating layer not only realizes variable refractive index gratings and grating switching, but also achieves no viewing angle range limit and fast response. By controlling the light emitting direction, the emitted light is converged to the pupil position, and the near-eye display can be achieved to meet the requirements of VR/AR. By using a thick light waveguide layer, the light utilization efficiency is higher, the screen brightness is improved, and the power consumption is reduced.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

REFERENCE NUMERALS

1, Conductive droplet;
2, base substrate;
3, electrode;
4, drop of first medium;
5, second medium;
10, light waveguide layer;
20, first substrate;
30, electrowetting control layer;
31, first electrode layer;
32, grating layer;
33, electrowetting layer;
34, second electrode layer;
331, first fluid
332, second fluid;
333, aqueous fluid; and
334, oily fluid.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
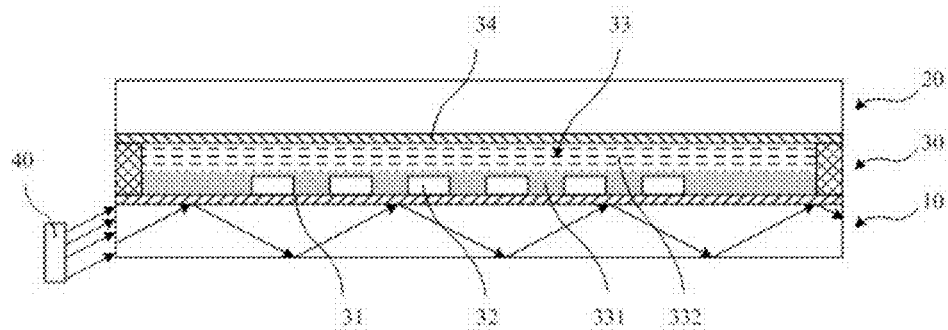
FIG. 1 is a schematic structural diagram of a display panel according to an embodiment of the present disclosure.

At least one embodiment of the present disclosure provides a display panel based on electrowetting technology. FIG. 1 is a schematic structural diagram of a display panel according to an embodiment of the present disclosure. As illustrated in FIG. 1, the main structure of the display panel of the embodiment of the present disclosure comprises a light waveguide layer 10 and a first substrate 20 disposed opposite to each other, and an electrowetting control layer 30 disposed between the light waveguide layer 10 and the first substrate 20. One or more side surfaces of the light waveguide layer 10 are configured as an incident surface for collimated backlight, and the electrowetting control layer 30 is configured to couple with light in the light waveguide layer 10 so as to form light with a set transmittance, a setting direction, and a set wavelength. That is, the electrowetting control layer 30 is configured to set the display grayscale of each pixel area (setting transmittance), set the light emission direction of each pixel area (setting direction), and set the light emission color of each pixel area (setting wavelength), so as to emit light of a specific color with a specific display grayscale in a specific direction in each pixel area. For example, three pixel regions can be set to form one pixel, through the electrowetting control layer 30, display grayscales of three pixel regions are set, and light emission colors of the three pixel regions are set to red light R, green light G, and blue light B, respectively, and the light emission direction of each pixel area are set to the middle of the pixel area, thus achieving high transmittance, high resolution, and near-eye display.

As illustrated in FIG. 1, the left side surface of the light waveguide layer is configured as an incident surface for collimated backlight, and of course, a plurality of side surfaces of the optical waveguide layer (for example, a right side surface opposite to the left side surface, and a front side surface and a back side which are not shown in the drawings) can be configured as an incident surface for collimated backlight. The collimated backlight is incident at an angle greater than or equal to the critical angle, multiple total reflections occur during transmission in the light waveguide layer, ensuring that the light travels long distances in the light waveguide layer, and is oscillatorily coupled with the electrowetting control layer, such that specific color light is coupled out of the light waveguide layer in a specific direction (the details will be described below). For example, the optical waveguide layer can be configured as a second substrate, that is, the second substrate and the optical waveguide layer can integrated with each other. And alternatively, a second substrate can be separately provided, and the light waveguide layer can be disposed on the second substrate. The second substrate and the first substrate can be cell-assembled through sealant, and the electrowetting control layer is encapsulated in the cell. In addition, the display panel can further comprise a first protection film disposed on a side of the first substrate facing away from the waveguide layer/the second substrate, and a second protection film on a side of the light waveguide layer/the second substrate facing away from the first substrate. Each of the first protection film and the second protection film is configured to protect the display panel. Each of the first protection film and the second protection film can be a film attached to a surface, or can be a coating applied to a surface.

The electrowetting control layer 30 is a light emitting control layer based on electrowetting technology. As illustrated in FIG. 1, the electrowetting control layer 30 includes a first electrode layer 31, a grating layer 32, an electrowetting layer 33, and a second electrode layer 34. The grating layer 32 is disposed on the first electrode layer 31. The electrowetting layer 33 is disposed on the grating layer 32, and the second electrode layer 34 is disposed on the electrowetting layer 33. The electrowetting control layer 33 is sandwiched between the light waveguide layer 10 and the first substrate 20, the first electrode layer 31 is disposed adjacent to the light waveguide layer 10, and the second electrode layer 34 is disposed adjacent to the first substrate 20. The light waveguide layer 10 and the grating layer 32 form a waveguide grating coupler to achieve selection of the light emitting direction and the light color, that is, the waveguide grating coupler couples light of a specific wavelength in a specific direction (which will be described later). The first electrode layer 31 and the second electrode layer 34 are configured to apply a voltage to the electrowetting layer 33. By applying various voltage intensities, the grating layer 32 and the electrowetting layer 33 are controlled to realize variable waveguide grating coupling and grating switching so as to control light transmittance, thereby achieving grayscale display. The electrowetting layer 33 comprises a first fluid 331 having conductive characteristics and a second fluid 332 having insulating characteristics, or comprises a first fluid 331 having insulating characteristics and a second fluid 332 having conductive characteristics. By changing a voltage across conductive droplets applied through the first electrode layer 31 and the second electrode layer 34, a contact angle of the conductive droplets with the grating layer is changed, so that the first fluid 331 and the second fluid 332 cover the grating layer 32 to different extents, thereby achieving variable waveguide grating coupling effects and grating switching, thus enabling grayscale display. For example, the first electrode layer 31 can be disposed in contact with a surface of the light waveguide layer 10, or can be disposed in contact with other functional film layers provided on the light waveguide layer 10. The second electrode layer 34 can be disposed in contact with a surface of the first substrate 20, or can be disposed in contact with other functional film layers provided on the first substrate 20.

In an embodiment of the present disclosure, the grating layer can be a micro-grating layer or a nano-grating layer.

Figure 2:
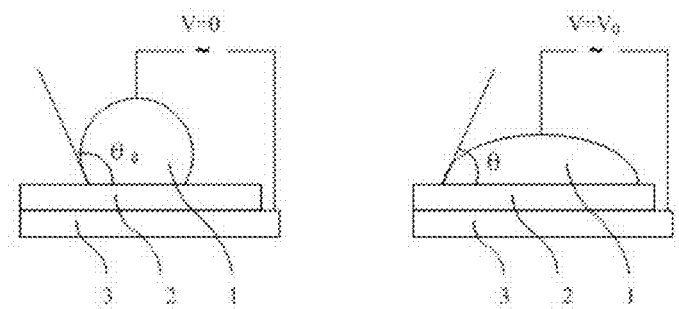
FIG. 2 is a schematic diagram of the principle of electrowetting.

Electrowetting (EW) display technology is based on the electrowetting of droplets on a medium. The phenomenon of electrowetting of droplets on a medium refers to changing the wettability of the droplets on the medium by changing the voltage applied to the droplets on the medium, that is, changing the contact angle θ of the droplets with the medium, such that the droplets are deformed and displaced. FIG. 2 is a schematic diagram of the principle of electrowetting, illustrating the change of the contact angle of a droplet with a medium before and after applying a voltage. As illustrated in FIG. 2, a conductive droplet 1 is located on a liquid-repellent substrate 2, a voltage V is applied to the conductive droplet 1 and the substrate 2 through the electrode 3. Before the voltage is applied (V=0), the contact angle of the conductive droplet 1 with the substrate 2 is $\theta_0$. And after the voltage is applied (V=V$_0$), the contact angle changes significantly, causing the droplet to deform.

Since Lippman discovered the electrowetting in 1875, electrowetting technology has received widespread attention. The main research and applications comprise the application of electrowetting technology to reflective displays, transmissive displays, and convertible optical convex/concave microfluidic lenses, optic fiber communication converters, and biomedical chips. Among them, the use of electrowetting technology as a new generation of display technology has attracted widespread attention, and display models based on electrowetting technology have also been proposed.

Figure 3:
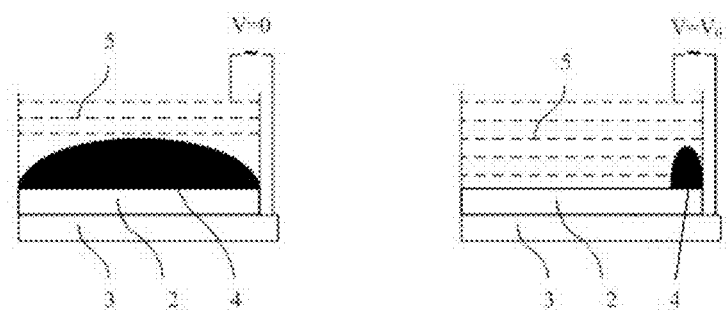
FIG. 3 is a schematic diagram of a basic model based on electrowetting display.

FIG. 3 is a schematic diagram of a basic model based on electrowetting display. As illustrated in FIG. 3, before the voltage is applied (V=0), the dyed first medium droplet 4 wets the entire surface of the substrate 2. At this time, the light cannot pass through the dyed first medium droplet 4 and a dark state is displayed. After the voltage is applied (V=V$_0$), due to the electrowetting effect, the contact angle of the first medium droplet 4 with the substrate 2 changes, and the first medium droplet shrinks into a small droplet and moves to the end side, and the transparent second medium 5 spreads over the substrate 2, the light can pass through the transparent second medium 5, and the bright state is displayed at this time. By applying different voltages, the contact angle of the first medium droplet 4 with the substrate 2 is adjusted so that the area occupied by the first medium droplet 4 on the substrate 2 is different, so that area of the second substrate 2 occupied by the transparent second medium 5 changes. Thus various grayscales can be displayed and a grayscale display can be achieved. The main difference between the electrowetting display technology and the liquid crystal display technology is that since the electrowetting technology dynamically changes the wavelength and brightness of reflected or transmitted light by changing the surface area of the liquid, it does not require a polarizer, no polarization is required and viewing angle is not limited. At the same time, since the electrowetting phenomenon of the first dielectric droplet 4 on the substrate 2 is faster in response to the applied voltage than the liquid crystal rotates in response to the voltage, the display device based on the electrowetting technique has a fast response.

Figure 4:
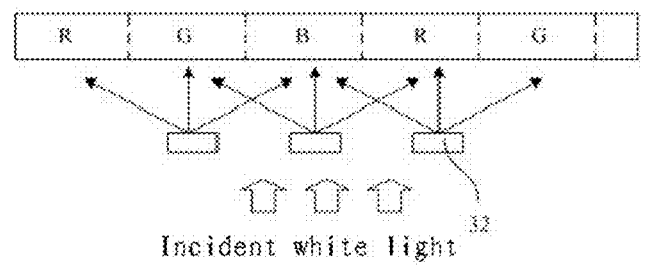
FIG. 4 is a schematic diagram of a waveguide grating coupler according to an embodiment of the present disclosure.

The basic principle of the waveguide grating coupler is that the incident light excites the m-order guided mode in the waveguide to achieve the selection of the light emitting direction and the light color. FIG. 4 is a schematic diagram of a waveguide grating coupler according to an embodiment of the present disclosure. After the collimated backlight is incident on one or more side surfaces of the light waveguide layer, when an included angle is formed between the collimated backlight and the surface of the light waveguide layer, and the included angle is greater than the critical angle, the collimated backlight entering the optical waveguide layer will be totally reflected, generating m-order guided modes. Through the coupling of a specific mode in the grating layer and the light waveguide layer, the selection of the light emitting direction and the light color can be achieved, that is, the waveguide grating coupler couples the light of a specific wavelength (color) in a specific direction. According to the diffraction grating formula:

$$N_i \sin \theta_i = n_d \sin \theta_d = m^* \lambda / \Lambda (m=0,+/-1,2,\ldots)$$

Where $n_i$ and $\theta_i$ are the incident spatial refractive index and incident angle, respectively, m is the diffraction order, Λ is the grating period, λ is the incident light wavelength, and $\theta_d$ an included angle between the light emitting direction, that is, the direction of the diffracted light, and the normal line of the plane of the display panel, $n_d$, is the equivalent refractive index of the electrowetting layer, the second electrode layer, and the first substrate (a mean obtained by directly averaging the three). In actual implementation, the light emitting direction can be accurately designed by professional optical simulation software. In typical AR/VR application scenarios, the light emitting direction of the pixel region at a certain position on the display panel is usually fixed, which is determined by the position of the pixel region relative to the human eye. That is, the light emitting direction $\theta_d$ of the display mode in the above equation is stable. At this time, by adjusting the grating period Λ, a given color light (given wavelength λ) can be emitted in the light emitting direction $\theta_d$. As illustrated in FIG. 4, the white incident light is coupled to the R, G, B three-color light through the grating layer, and the light emitting direction of the R color light is directed to the R pixel region, and the light emitting direction of the G color light is directed to the G pixel region, and the light emitting direction of the B color light is directed to the B pixel region, light of a specific color is emitted from each pixel region in a specific direction. By selecting appropriate material for the grating layer, material for the electrode layer, and material for the electrowetting layer, the contact angle of the conductive droplets can be varied by adjusting the voltage applied to the electrowetting layer, thereby achieving a variable refractive index grating and a grating switching. Of course, in the implementation, the type of color is not limited to three colors of R, G, and B, and it may be four colors of R, G, B, and W (white), or other three colors.

In the embodiments of the present disclosure, the grating period A is several micrometers or several hundred nanometers, and the light can be effectively coupled out from the light waveguide layer, and the grating period corresponding to each pixel region is generally small, so the size of each pixel region can be made small, thereby achieving a high PPI (Pixels per inch) display. Because the waveguide grating coupler selects the color of the emitted light, the display panel can eliminate the color filter layer in the conventional LCD. Since the waveguide grating coupler couples the incident collimated backlight directly, the polarizer in the conventional LCD is eliminated. Since the wavelength and the brightness of the reflected or transmitted light are dynamically changed by changing the surface area of the liquid, the display panel does not need to be provided with a thin film transistor and a black matrix in a conventional LCD. And each functional layer of the display panel is made of a transparent material, thereby realizing transparent display with high transmittance which meet the needs of VR/AR. Due to the selection effect of the waveguide grating coupler on the light emitting direction, the light emitted by the display panel can be converged to a certain position on the display panel. When the pupil of the human eye is aligned with this position, the screen can be clearly viewed, and therefore near-eye display can be achieved. Since the light waveguide layer also serves as a second substrate with a relatively great thickness, the incident area of light is large, and therefore, the light utilization efficiency is high.

The display panel according to the embodiments of the present disclosure can be implemented in various ways. Several implementations will be exemplified hereinafter.

First Embodiment

In the present embodiment, the first fluid 331 adopts an aqueous fluid having conductive characteristics, the second fluid 332 adopts an oily fluid having insulating characteristics, and surfaces of the first electrode layer 31 and the grating layer 32 have hydrophobic characteristics. Herein, the hydrophobic characteristic surface refers to a surface on which an aqueous fluid condenses into a droplet shape without application of a voltage.

Figure 5:
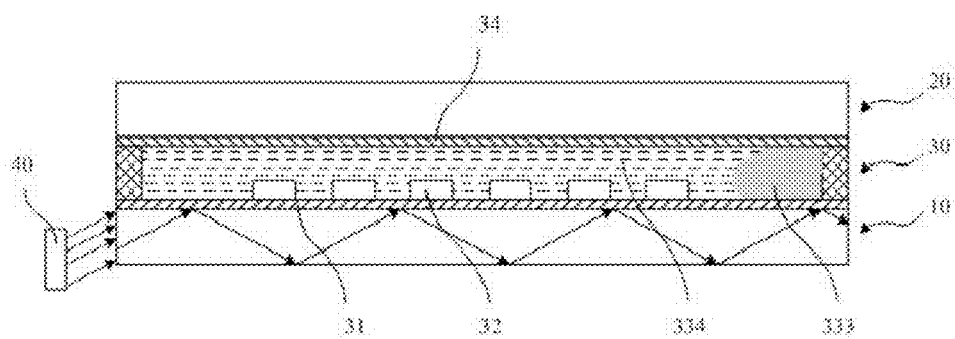
FIG. 5 to FIG. 7 are schematic diagrams of grayscale display of a display panel according to a first embodiment of the present disclosure.
Figure 6:
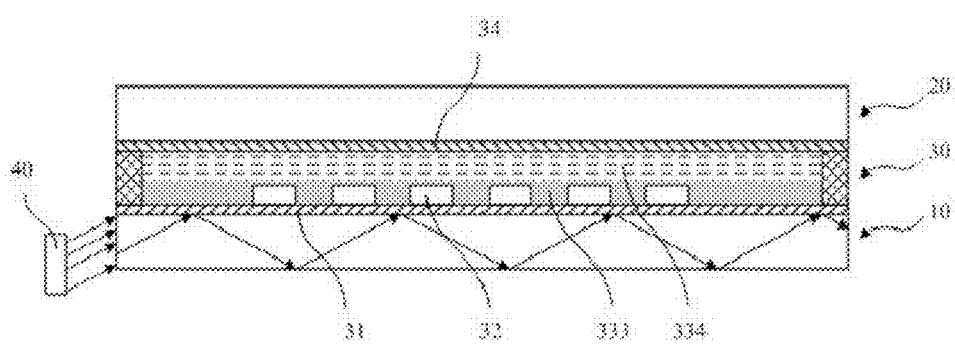
Figure 7:
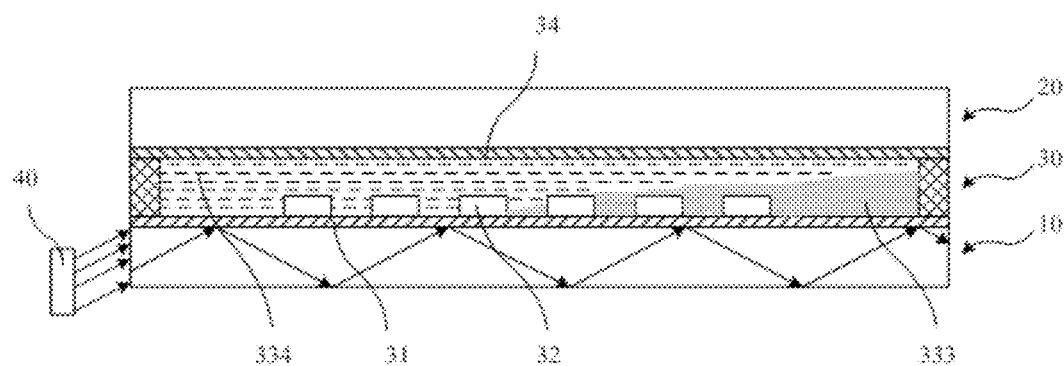

FIG. 5 to FIG. 7 are schematic diagrams of a grayscale display of a display panel according to a first embodiment of the present disclosure. As illustrated in FIG. 5, when the first electrode layer 31 and the second electrode layer 34 are not applied with a voltage, the contact angle of the aqueous fluid 333 is great, the aqueous fluid is condensed into droplets and is located at the end of a display region, and the grating layer 32 is exposed to the oily fluid 334 and is covered. When the refractive index of the oily fluid 334 and the refractive index of the grating layer 32 are largely different, the grating effect is the most obvious. The coupling effect of light is the strongest and the light is coupled out from the light waveguide layer. At this time, L255 state (the highest grayscale, i.e., bright state) is displayed. As illustrated in FIG. 6, when an appropriate voltage $V_0$ is applied to the first electrode layer 31 and the second electrode layer 34, the contact angle of the aqueous fluid 333 becomes small, and the grating layer 32 is completely covered by the aqueous fluid 333. When the refractive index of the aqueous fluid 333 is similar to the refractive index of the grating layer 32, the aqueous fluid 333 and the grating layer 32 are optically equivalent to one whole, the grating function of the grating layer 32 disappears, and light cannot be coupled out from the light waveguide layer. In this case, L0 state (the lowest grayscale, i.e., the dark state) is displayed. As illustrated in FIG. 7, when the voltage applied by the first electrode layer 31 and the second electrode layer 34 is between 0 and $V_0$, the contact angle of the aqueous fluid 333 is between the above two cases. The ratio of the areas of the grating layer 32 covered by the aqueous fluid 333 and the oil fluid 334 differs depending on the applied voltage, and different grayscale states can be achieved. In this embodiment, that the refractive index of the oily fluid and the refractive index of the grating layer are largely different means that the difference between the refractive indexes of the two is greater than or equal to 0.1, and that the refractive index of the aqueous fluid is similar to the refractive index of the grating layer means that the difference between the refractive indexes of the two is less than or equal to 0.05.

When implementing, the transparent oily fluid material can be selected to make the difference between the refractive index of the transparent oily fluid and the refractive index of the grating layer 32 large, and the coupling efficiency can be enhanced to a maximum extent. For example, the material for the grating layer is MY~130 Polymer resin (refractive index is about 1.33), and when the transparent oily fluid material is acrylic (refractive index is 1.5~1.6), the difference between the refractive index of the oily fluid and the refractive index of the grating layer is 0.17~0.27. N-dodecane or the like can also be used as the transparent oily fluid. Similarly, by selecting a suitable aqueous fluid, the difference between the refractive index of the aqueous fluid and the grating layer approaches zero, so that the aqueous fluid and the grating layer become entirely optically integral and the grating effect of the grating layer completely disappears. For example, when water is used as the aqueous fluid, and the refractive index of water is 1.3, the difference between the refractive index of the aqueous fluid and the refractive index of the grating layer is about 0.03. Materials for the first substrate and the second substrate can be glass or resin, and the thickness of the first substrate and the second substrate is 0.1 to 2 mm, and the refractive index of the first substrate and the second substrate is 1.6 to 2.0. The surface of the first substrate and the second substrate is required to have good flatness and parallelism. For example, the refractive indices of the first substrate and the second substrate can be selected to be 1.7 to 1.8, depending on product design or process conditions. The light waveguide layer is made of a material which is transparent and has a high refractive index with respect to the first and second substrates, such as (but not limited to) silicon nitride ($Si_3N_4$). The first electrode layer and the second electrode layer are plate electrodes, and are made of transparent conductive materials such as magnesium fluoride ($MgF2$), with a thickness of 50-1000 nm and a refractive index of 1.3-1.4, depending on actual product design requirements. The grating layer is made of a transparent dielectric material, such as silica SiO2 or a resin, with a refractive index of 1.4 to 1.5. The grating period is determined by the light emitting direction and color of the design, and the duty cycle is 0.1 to 0.9. For example, the duty cycle can be selected as 0.5 for easy machining. During the implementation, in order to adjust the light intensity of the light and the difference in brightness at different positions, the duty cycle can be set according to actual requirements. A thickness of the grating layer can be 100 to 1000 nm. For example, the thickness of the grating layer may be set to 500 nm. Considering that the coupling of the waveguide grating is not particularly sensitive to the height of the grating layer, a same grating height can be selected for the three pixel regions of R, G, and B, but not limited to this, and the heights of three pixel regions of R, G, and B can be respectively designed according to actual requirements. Transparent water and transparent oil can be used for the electrowetting layer 33, which is not limited. And the material for the electrowetting layer 33 can be selected in combination with the material of the grating layer. An aqueous fluid having the same refractive index as the grating layer material can be selected so as to achieve the L0 state (the dark state) without applying a voltage. And an oil fluid with the largest difference in refractive index from the material of the grating layer can be selected to achieve the L255 state (light state) under applying a voltage. The electrowetting layer 33 has a thickness of 1 to 5 um so that it covers the grating layer. And the thickness of the electrowetting layer 33 can also be designed in combination with other product parameters.

In the present embodiment, the grating layer can be a one-dimensional grating or a two-dimensional grating. As well known, light waves are electromagnetic waves, and the propagation direction of light waves is the propagation direction of electromagnetic waves. When electromagnetic waves propagate in free space, both the electric vector E and the magnetic vector H are perpendicular to the propagation direction. Therefore, the light waves are transverse waves and have polarization. For the transverse wave, the vibration direction of the wave is not symmetric with respect to the propagation direction. The asymmetry of the wave vibration direction to the propagation direction is called polarization. It is the most obvious sign of the transverse wave from the longitudinal wave, and only the transverse wave has the polarization.

Figure 8:
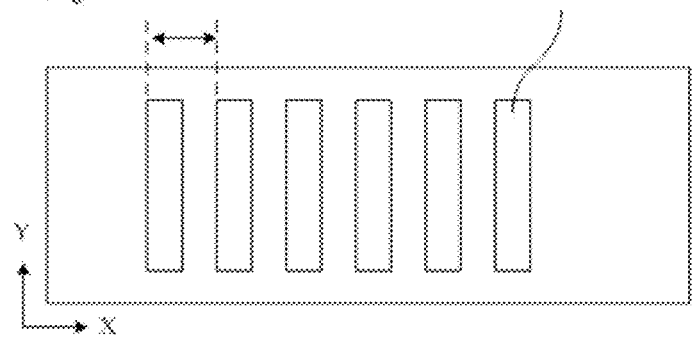
FIG. 8 is a schematic structural diagram of a one-dimensional grating according to a first embodiment of the present disclosure.

FIG. 8 is a schematic structural diagram of a one-dimensional grating according to a first embodiment of the present disclosure. As illustrated in FIG. 8, the XY plane is parallel to the display plane, and the one-dimensional grating comprises a plurality of grating stripes 321 arranged in sequence along the X direction. A polarized light with a vibration direction in the X direction (the e light) will sense the refractive index change while a polarized light with a vibration direction in the Y direction (the o light) will not sense the refractive index change. And then, the light coupled by the waveguide grating coupler is the polarized e light.

Figure 9:
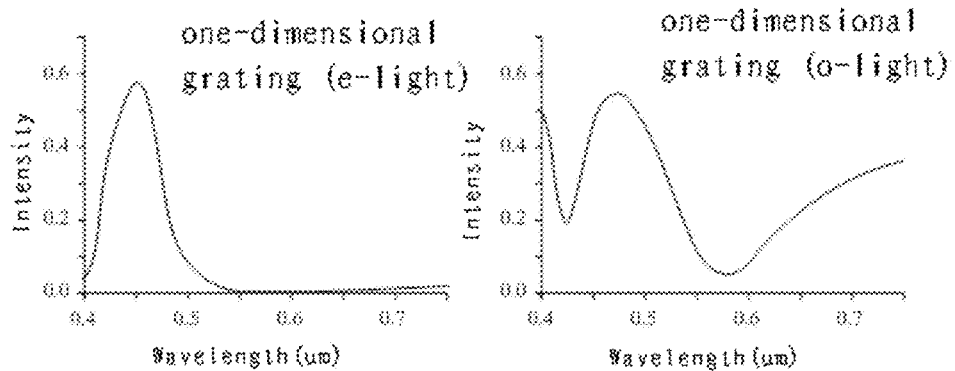
FIG. 9 is a spectrum of light emitted from the one-dimensional grating according to the first embodiment of the present disclosure.

FIG. 9 is a spectrum of light emitted from the one-dimensional grating according to a first embodiment of the present disclosure. As illustrated in FIG. 9, in the range of white light of 400-750 nm, the e light senses the refractive index change, while the other polarized o light does not sense the refractive index change, and the overall light utilization efficiency is affected. During the implementation, the one-dimensional grating is made of a transparent dielectric material, such as SiO2 or a resin, and the grating period A is determined by the designed light emitting direction and the color, and the duty cycle is 0.1 to 0.9. For example, the duty cycle can be chosen to be 0.5 to facilitate machining. The duty cycle refers to the ratio of the width or equivalent width of a grating strip to the grating period.

Figure 10:
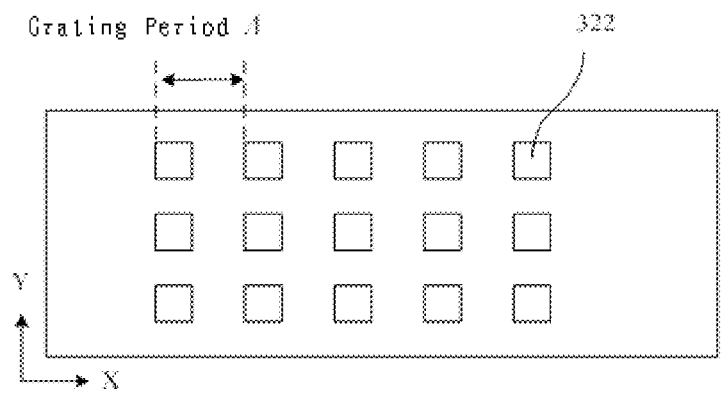
FIG. 10 to FIG. 11 are schematic structural diagrams of a two-dimensional grating according to a first embodiment of the present disclosure.
Figure 11:
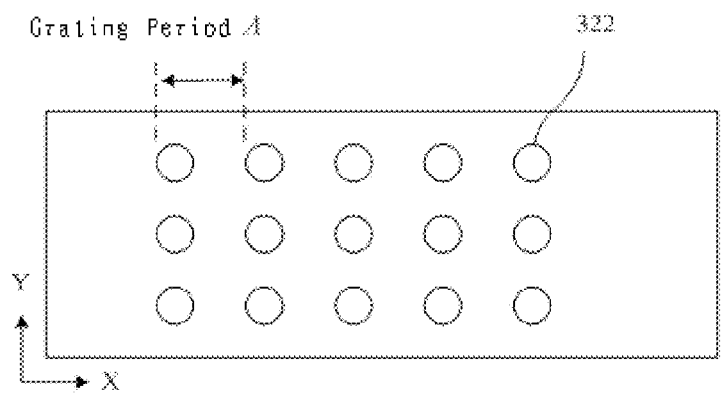

FIG. 10 and FIG. 11 are schematic structural views of a two-dimensional grating according to the first embodiment of the present disclosure. As illustrated in FIGS. 10 and 11, the XY plane is parallel to the display plane, and the two-dimensional grating includes multiple grating blocks 322 arranged matrix in the X and Y directions respectively. The grating blocks 322 have the same refractive index matrix in the two-dimensional directions, and thus the polarized light (e-light) in the X-direction and in the polarized light (o-light) in the Y-direction sense the refractive index change, respectively, and light utilization efficiencies of the o light and the e light are the same theoretically. At this time, the lights coupled from the waveguide grating coupler are o light and polarized e light.

Figure 12:
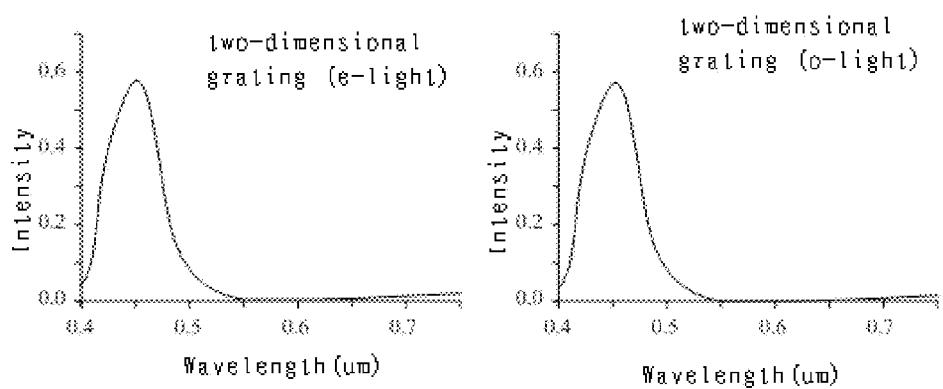
FIG. 12 is a spectrum of light emitted from the two-dimensional grating according to the first embodiment of the present disclosure.

FIG. 12 is a spectrum of light emitted from a two-dimensional grating according to the first embodiment of the present invention. As illustrated in FIG. 12, in the range of white light of 400-750 nm, both the o and the e light sense the refractive index change, and the utilization efficiencies of the emitted light are the same. Compared with the one-dimensional grating, in which only light of one mode is coupled. In general, the dimensional grating can narrow the average full width at half maxima (for enhancing the color purity), reduce the interference of other colors, and improve light utilization efficiency. The spectra of the emitted light illustrated in FIGS. 9 and 12 are obtained by solving the Maxwell's equations in the time domain and the frequency domain through a Finite Difference Time Domain (FDTD) method. In the implementation, the two-dimensional grating is made of a transparent dielectric material such as SiO2 or a resin. The grating period is determined by the light emitting direction and the color as designed, and the duty cycle is 0.1 to 0.9. For example, the duty cycle can be selected as 0.5 for facilitate machining. The cross-sectional shape of the grating block may be rectangular or circular, forming a two-dimensional block grating or a two-dimensional column grating. In actual implementation, the cross-sectional shape of the grating block can also be other regular shapes to meet actual requirements, and it is not limited in the present disclosure.

In the present disclosure embodiment, the grating layer comprises a plurality of grating structures arranged corresponding to each pixel region, and the grating period of the grating structure corresponding to each pixel region is constant. In implementation, the respective grating periods of the respective pixel regions can be the same. However, in order to control the light emission direction of each pixel region so as to make the light emission direction of each pixel region directed toward the set position, the respective grating periods of the respective pixel regions can be different and change according to sets modes. For example, it can be configured that the grating periods of any two adjacent pixel regions are different, or the grating periods of a plurality of pixel regions are the same, and then the grating periods of the plurality of pixel regions and the grating periods of another plurality of pixel regions adjacent to the plurality of pixel regions are different.

Second Embodiment

A display panel structure and a grating structure according to the second embodiment of the present disclosure are the same as the display panel structure and the grating in the first embodiment, and material for the first/second substrate, material for the first/second electrode layer, material for the first/second fluid, and material for the grating layer are also the same as in the first embodiment. What is different from the first embodiment is that the surfaces of the first electrode layer and the grating layer in the present embodiment have hydrophilic characteristics. Herein, the hydrophilic characteristic surface refers to a surface where the aqueous fluid wets the surface and spreads over the entire surface when no voltage is applied.

The process of grayscale display in the present embodiment is as follows: when the first electrode layer and the second electrode layer are not applied with voltage, the contact angle of the aqueous fluid with the hydrophilic characteristic surface is small, and the aqueous fluid wets the surfaces of the first electrode layer and the grating layer and spreads over the entire surface, and the grating layer is completely covered by the aqueous fluid. Since the refractive index of the aqueous fluid is close to that of the grating layer, the aqueous fluid and the grating layer form an integral body, the function of the grating layer disappears, and the light cannot be coupled out from the light waveguide layer. Then, the L0 state (i.e., dark state) is displayed. When the first electrode layer and the second electrode layer are applied with an appropriate voltage $V_0$, the contact angle of the aqueous fluid with the hydrophilic characteristic surface is large, the aqueous fluid condenses into droplets and is located at the end of the display area, and the grating layer is exposed to the oily fluid and covered by the oily fluid. The refractive index of the oily fluid and the refractive index of the grating layer have a large difference, the grating effect is obvious, and the light coupling effect is strong, and the light is coupled out from the light waveguide layer. At this time, the L255 state (i.e., the bright state) is displayed. When the first electrode layer and the second electrode layer are applied with a voltage between 0 and V0, the contact angle of the aqueous fluid with the hydrophilic characteristic surface is between the above two cases, and the ratio of the area of the grating layer covered by the aqueous fluid to the area of the grating layer covered by the oily fluid varies as different voltages are applied, and thus different grayscales can be displayed.

Third Embodiment

A display panel structure and a grating structure according to the present embodiment of the present disclosure are the same as the display panel structure and the grating in the first embodiment, and material for the first/second substrate, material for the first/second electrode layer, material for the first/second fluid, and material for the grating layer are also the same as in the first embodiment. What is different from the first embodiment is that, in the present embodiment, the first fluid adopts an aqueous fluid having insulating characteristics, the second fluid adopts an oil fluid having conductive characteristics, and surfaces of the first electrode layer and the grating layer have oleophobic characteristics. Wherein, the aqueous fluid having insulating characteristics can be obtained by removing electrolyte in an aqueous fluid and the oil fluid having conductive characteristics can be obtained by adding conductive particles into the an oil fluid.

The process of grayscale display in the present embodiment is as follows: when the first electrode layer and the second electrode layer are not applied with voltage, the contact angle of the oily fluid with the surface of oleophobic property is great, and the oily fluid is condensed into an oil droplet and is located at the end of the display area. The grating layer is exposed to the aqueous fluid and covered by the aqueous fluid. Since the refractive index of the aqueous fluid is close to the refractive index of the grating layer, the aqueous fluid and the grating layer are equivalent to one whole, the function of the grating layer disappears, and light cannot be extracted from the light waveguide layer. Then, the L0 state (i.e., the dark state) is displayed. When the first electrode layer and the second electrode layer are applied with an appropriate voltage $V_0$, the contact angle of the conductive oily fluid with the surface of oleophobic property becomes smaller, the grating layer is exposed to the oily fluid and completely covered by the oily fluid. As the big difference between the refractive index of the oily fluid and the grating layer, the grating effect is obvious, the light coupling effect is strong, and the light is coupled out from the light waveguide layer. At this time, the L255 state (i.e., the bright state) is displayed. When the first electrode layer and the second electrode layer are applied with a voltage between 0 and $V_0$, the contact angle of the oily fluid is between the above two cases, and the ratio of the area of the grating layer covered by the aqueous fluid to the area of the grating layer covered by the oily fluid varies as different voltages are applied, and thus different grayscales can be displayed.

In practical implementation, the embodiment can also be modified accordingly, and the surfaces of the first electrode layer and the grating layer are set to have lipophilic characteristics, and the principle of displaying grayscale is similar to the foregoing embodiment, which will not be elaborated here.

Embodiments of the present disclosure provide a display panel and a display device. In the display panel, an electrowetting layer based on electrowetting technology and a grating layer based on a light waveguide grating coupling technology are provided. A light color is selected through the grating layer so that a color filter is eliminated, and the light emitting direction is controlled through the grating layer such that a polarizer is eliminated. And as each of the functional layers is made of transparent material, a high transmittance display is achieved. Since the grating layer can couple light out in the range of micron or nano grating periods, the size of the pixel area can be made small, thus achieving a high PPI display. Combining the electrowetting layer and the grating layer not only realizes variable refractive index gratings and grating switching, but also achieves no viewing angle range limit and fast response. By controlling the light emitting direction, the emitted light is converged to the pupil position, and the near-eye display can be achieved to meet the requirements of VR/AR. By using a thick light waveguide layer, the light utilization efficiency is higher, the screen brightness is improved, and the power consumption is reduced.

At least one embodiment of the present disclosure further provides a display device including the display device which comprises the display panel as described above and an edge-type collimated backlight source 40. Wherein, the edge-type collimated backlight source 40 is configured to generate a collimated backlight which can be obtained by mixing the red R, green G, and blue B emitted from three-color semiconductor laser chips, and can also be obtained by mixing R, G and B lights emitted from RGB LED with better collimation performance, or can be obtained by light emitted from white light LED chips with better collimation, or can be obtained by collimating light emitted from strip-shaped CCFL lamps. The structures for the edge-type collimated backlight source mentioned are illustrative, and it is not limited herein. The light emitting direction of the edge-type collimating backlight 40 is required to be at an angle with the normal line of the light waveguide layer/the second substrate so that incident light can be total reflected in the light waveguide layer/second substrate while ensuring the waveguide grating coupler has a certain light emitting efficiency. The display device according to the embodiments of the present disclosure can be any product or component having a display function such as a VR helmet, VR glasses, a mobile phone, a tablet computer, a television, a monitor, a laptop, a digital photo frame, a navigator, and the like.

It should be noted that the terms "middle", "upper", "lower", "front", "back", "vertical", "horizontal", "top", "bottom", "inner", and "outer", and the like used in the description of the embodiments of the present disclosure indicate the orientation or positional relationship based on the orientation or positional relationship illustrated in the drawings, and are merely for convenience of describing the present disclosure and simplifying the description, but are not intended to indicate or imply that the designated device or component must have a particular orientation, a particular configuration, or a particular operation, and cannot be construed as a limit to the present disclosure.

In the description of the embodiments of the present disclosure, it should be noted that the terms "install", "connected", and "connected" should be interpreted broadly unless specifically defined or limited otherwise. For example, they can be fixed connections or they can be detachable connections, or integrally connected; or they can be mechanical or electrical connections; they can be directly connected, or they can be indirectly connected through the intermediary, or they can be the internal communication of two components. For one of ordinary skill in the art, the specific meanings of the above terms in the present disclosure can be understood according to specific situations.

The foregoing are merely exemplary embodiments of the disclosure, but are not used to limit the protection scope of the disclosure. The protection scope of the disclosure shall be defined by the attached claims.

The present disclosure claims priority of Chinese Patent Application No. 201710138779.7 filed on Mar. 9, 2017, the disclosure of which is hereby entirely incorporated by reference.

The invention claimed is:

1. A display panel, comprising a light waveguide layer and a first substrate disposed opposite to each other, and further comprising an electrowetting control layer disposed between the light waveguide layer and the first substrate, the electrowetting control layer comprising a first electrode layer, a second electrode layer, and a grating layer and an electrowetting layer which are disposed between the first electrode layer and the second electrode layer, the grating layer and the electrowetting layer are configured to operatively couple light with a set transmittance, a setting direction, and a set wavelength out of the light waveguide layer; and wherein the electrowetting layer comprises a first fluid and a second fluid, a difference between a refractive index of the first fluid and a refractive index of the grating layer is less than or equal to 0.05, and difference between a refractive index of the second fluid and a refractive index of the grating layer is greater than or equal to 0.1.

2. The display panel according to claim 1, wherein the first electrode layer is disposed on a side of the light waveguide layer facing the first substrate, the second electrode layer is disposed on a side of the first substrate facing the light waveguide layer, the grating layer is disposed on a side of the first electrode layer adjacent to the first substrate, and the electrowetting layer is disposed on a side of the grating layer adjacent to the first substrate.

3. The display panel according to claim 2, wherein the electrowetting layer comprises a first fluid and a second fluid, a difference between a refractive index of the first fluid and a refractive index of the grating layer is less than or equal to 0.05, and difference between a refractive index of the second fluid and a refractive index of the grating layer is greater than or equal to 0.1.

4. The display panel according to claim 3, wherein surfaces of the first electrode layer and the grating layer have hydrophobic characteristics, the first fluid is an aqueous fluid having conductive characteristics, the second fluid is an oily fluid having insulating characteristics; or surfaces of the first electrode layer and the grating layer have hydrophilic characteristics, the first fluid is an aqueous fluid having insulating characteristics, and the second fluid is an oily fluid having conductive characteristics.

5. The display panel according to claim 2, wherein one or more side surfaces of the light waveguide layer are configured as an incident surface for collimated backlight, the light waveguide layer and the grating layer form a waveguide grating coupler, wherein a refractive index of the light waveguide layer is greater than a refractive index of the first electrode layer and the grating layer.

6. The display panel according to claim 2, further comprising a second substrate, wherein the light waveguide layer is disposed on the second substrate, or the light waveguide layer and the second substrate form an integral structure.

7. The display panel according to claim 2, wherein the grating layer is a one-dimensional grating which comprises a plurality of grating stripes, the one-dimensional grating is made of a transparent dielectric material, a thickness of the one-dimensional grating is 100 to 1000 nm, and the duty cycle of the one-dimensional grating is 0.1 to 0.9.

8. The display panel according to claim 2, wherein the grating layer is a two-dimensional grating which comprises a plurality of grating blocks arranged in matrix, the plurality of grating blocks are made of a transparent dielectric material, a thickness of the plurality of grating blocks is 100 to 1000 nm, and the duty cycle of the plurality of grating blocks is 0.1 to 0.9.

9. The display panel according to claim 2, further comprising a first protection film and/or a second protection film, wherein the first protection film is disposed on a side of the light waveguide layer facing away from the first substrate, and/or the second protection film is disposed on a side of the first substrate facing away from the light waveguide layer.

10. The display panel according to claim 2, wherein the grating layer is a micro-grating layer or a nano-grating layer.

11. The display panel according to claim 1, wherein surfaces of the first electrode layer and the grating layer have hydrophobic characteristics, the first fluid is an aqueous fluid having conductive characteristics, the second fluid is an oily fluid having insulating characteristics; or surfaces of the first electrode layer and the grating layer have hydrophilic characteristics, the first fluid is an aqueous fluid having insulating characteristics, and the second fluid is an oily fluid having conductive characteristics.

12. The display panel according to claim 1, wherein one or more side surfaces of the light waveguide layer are configured as an incident surface for collimated backlight, the light waveguide layer and the grating layer form a waveguide grating coupler, wherein a refractive index of the light waveguide layer is greater than a refractive index of the first electrode layer and the grating layer.

13. The display panel according to claim 1, further comprising a second substrate, wherein the light waveguide layer is disposed on the second substrate, or the light waveguide layer and the second substrate form an integral structure.

14. The display panel according to claim 1, wherein the grating layer is a one-dimensional grating which comprises a plurality of grating stripes, the one-dimensional grating is made of a transparent dielectric material, a thickness of the one-dimensional grating is 100 to 1000 nm, and a duty cycle of the one-dimensional grating is 0.1 to 0.9.

15. The display panel according to claim 1, wherein the grating layer is a two-dimensional grating which comprises a plurality of grating blocks arranged in matrix, the plurality of grating blocks are made of a transparent dielectric material, a thickness of the plurality of grating blocks is 100 to 1000 nm, and a duty cycle of the plurality of grating blocks is 0.1 to 0.9.

16. The display panel according to claim 1, further comprising a first protection film and/or a second protection film, wherein the first protection film is disposed on a side of the light waveguide layer facing away from the first substrate, and/or the second protection film is disposed on a side of the first substrate facing away from the light waveguide layer.

17. The display panel according to claim 1, wherein the grating layer is a micro-grating layer or a nano-grating layer.

18. A display device, comprising the display panel according to claim 1.

19. The display device according to claim 18, further comprising an edge-type collimated backlight source which is configured to generate collimated light and is disposed on at least one side of the light waveguide layer.

* * * * *